United States Patent
Demirovic et al.

(10) Patent No.: US 8,801,567 B2
(45) Date of Patent: Aug. 12, 2014

(54) METHOD AND APPARATUS FOR EXECUTING AN ASYNCHRONOUS CLUTCH-TO-CLUTCH SHIFT IN A HYBRID TRANSMISSION

(75) Inventors: Besim Demirovic, Troy, MI (US); Pinaki Gupta, Wixom, MI (US); Lawrence A. Kaminsky, White Lake, MI (US); Ali K. Naqvi, White Lake, MI (US); Anthony H. Heap, Ann Arbor, MI (US); Jy-Jen F. Sah, West Bloomfield, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 251 days.

(21) Appl. No.: 13/398,993

(22) Filed: Feb. 17, 2012

(65) Prior Publication Data

US 2013/0217536 A1    Aug. 22, 2013

(51) Int. Cl.
*B60W 10/10*    (2012.01)
*B60W 20/00*    (2006.01)

(52) U.S. Cl.
USPC .................................................. 477/5; 477/98

(58) Field of Classification Search
USPC ............................. 477/5, 98, 115; 180/65.285
See application file for complete search history.

(56) References Cited

U.S. PATENT DOCUMENTS

| | | | |
|---|---|---|---|
| 6,832,148 B1 | 12/2004 | Bennett | |
| 6,868,318 B1 | 3/2005 | Cawthorne | |
| 7,154,236 B1 | 12/2006 | Heap | |
| 7,976,428 B2 * | 7/2011 | Matsubara et al. | 477/15 |
| 8,550,958 B2 * | 10/2013 | Sah | 477/5 |
| 2005/0076958 A1 | 4/2005 | Foster | |
| 2005/0077867 A1 | 4/2005 | Cawthorne | |
| 2005/0077877 A1 | 4/2005 | Cawthorne | |
| 2005/0080523 A1 | 4/2005 | Bennett | |
| 2005/0080527 A1 | 4/2005 | Tao | |
| 2005/0080535 A1 | 4/2005 | Steinmetz | |
| 2005/0080537 A1 | 4/2005 | Cawthorne | |
| 2005/0080538 A1 | 4/2005 | Hubbard | |
| 2005/0080539 A1 | 4/2005 | Hubbard | |
| 2005/0080540 A1 | 4/2005 | Steinmetz | |
| 2005/0080541 A1 | 4/2005 | Sah | |
| 2005/0182526 A1 | 8/2005 | Hubbard | |
| 2005/0182543 A1 | 8/2005 | Sah | |
| 2005/0182546 A1 | 8/2005 | Hsieh | |
| 2005/0182547 A1 | 8/2005 | Sah | |
| 2005/0189918 A1 | 9/2005 | Weisgerber | |
| 2005/0252283 A1 | 11/2005 | Heap | |
| 2005/0252305 A1 | 11/2005 | Hubbard | |
| 2005/0252474 A1 | 11/2005 | Sah | |

(Continued)

FOREIGN PATENT DOCUMENTS

JP         2012245833 A   * 12/2012

*Primary Examiner* — Roger Pang

(57) ABSTRACT

A hybrid transmission includes first and second electric machines. A method for operating the hybrid transmission in response to a command to execute a shift from an initial continuously variable mode to a target continuously variable mode includes increasing torque of an oncoming clutch associated with operating in the target continuously variable mode and correspondingly decreasing a torque of an off-going clutch associated with operating in the initial continuously variable mode. Upon deactivation of the off-going clutch, torque outputs of the first and second electric machines and the torque of the oncoming clutch are controlled to synchronize the oncoming clutch. Upon synchronization of the oncoming clutch, the torque for the oncoming clutch is increased and the transmission is operated in the target continuously variable mode.

11 Claims, 4 Drawing Sheets

(56) References Cited

U.S. PATENT DOCUMENTS

| | | |
|---|---|---|
| 2005/0255963 A1 | 11/2005 | Hsieh |
| 2005/0255964 A1 | 11/2005 | Heap |
| 2005/0255965 A1 | 11/2005 | Tao |
| 2005/0255966 A1 | 11/2005 | Tao |
| 2005/0255967 A1 | 11/2005 | Foster |
| 2005/0255968 A1 | 11/2005 | Sah |
| 2005/0256617 A1 | 11/2005 | Cawthorne |
| 2005/0256618 A1 | 11/2005 | Hsieh |
| 2005/0256623 A1 | 11/2005 | Hubbard |
| 2005/0256625 A1 | 11/2005 | Sah |
| 2005/0256626 A1 | 11/2005 | Hsieh |
| 2005/0256627 A1 | 11/2005 | Sah |
| 2005/0256629 A1 | 11/2005 | Tao |
| 2005/0256631 A1 | 11/2005 | Cawthorne |
| 2005/0256633 A1 | 11/2005 | Heap |
| 2005/0256919 A1 | 11/2005 | Cawthorne |
| 2006/0194670 A1 | 8/2006 | Heap |
| 2007/0078580 A1 | 4/2007 | Cawthorne |
| 2007/0093953 A1 | 4/2007 | Heap |
| 2007/0149348 A1 | 6/2007 | Holmes |
| 2007/0191181 A1 | 8/2007 | Burns |
| 2007/0225886 A1 | 9/2007 | Morris |
| 2007/0225887 A1 | 9/2007 | Morris |
| 2007/0225888 A1 | 9/2007 | Morris |
| 2007/0225889 A1 | 9/2007 | Morris |
| 2007/0260381 A1 | 11/2007 | Sah |
| 2007/0276569 A1 | 11/2007 | Sah |
| 2007/0284162 A1 | 12/2007 | Zettel |
| 2007/0284163 A1 | 12/2007 | Heap |
| 2007/0284176 A1 | 12/2007 | Sah |
| 2007/0285059 A1 | 12/2007 | Zettel |
| 2007/0285060 A1 | 12/2007 | Zettel |
| 2007/0285061 A1 | 12/2007 | Zettel |
| 2007/0285063 A1 | 12/2007 | Zettel |
| 2007/0285097 A1 | 12/2007 | Zettel |
| 2008/0004779 A1 | 1/2008 | Sah |
| 2008/0028879 A1 | 2/2008 | Robinette |
| 2008/0032855 A1 | 2/2008 | Sah |
| 2008/0064559 A1 | 3/2008 | Cawthorne |
| 2008/0064562 A1 | 3/2008 | Zettel |
| 2008/0103003 A1 | 5/2008 | Sah |
| 2008/0119320 A1 | 5/2008 | Wu |
| 2008/0119321 A1 | 5/2008 | Heap |
| 2008/0120000 A1 | 5/2008 | Heap |
| 2008/0120001 A1 | 5/2008 | Heap |
| 2008/0120002 A1 | 5/2008 | Heap |
| 2008/0176706 A1 | 7/2008 | Wu |
| 2008/0176709 A1 | 7/2008 | Wu |
| 2008/0181280 A1 | 7/2008 | Wang |
| 2008/0182696 A1 | 7/2008 | Sah |
| 2008/0183372 A1 | 7/2008 | Snyder |
| 2008/0234097 A1 | 9/2008 | Sah |
| 2008/0236921 A1 | 10/2008 | Huseman |
| 2008/0243346 A1 | 10/2008 | Huseman |
| 2008/0249745 A1 | 10/2008 | Heap |
| 2008/0262694 A1 | 10/2008 | Heap |
| 2008/0262698 A1 | 10/2008 | Lahti |
| 2008/0272717 A1 | 11/2008 | Gleason |
| 2008/0275611 A1 | 11/2008 | Snyder |
| 2008/0275624 A1 | 11/2008 | Snyder |
| 2008/0275625 A1 | 11/2008 | Snyder |
| 2008/0287255 A1 | 11/2008 | Snyder |
| 2009/0069148 A1 | 3/2009 | Heap |
| 2009/0069989 A1 | 3/2009 | Heap |
| 2009/0070019 A1 | 3/2009 | Heap |
| 2009/0082170 A1 | 3/2009 | Heap |
| 2009/0088294 A1 | 4/2009 | West |
| 2009/0105039 A1 | 4/2009 | Sah |
| 2009/0105896 A1 | 4/2009 | Tamai |
| 2009/0105898 A1 | 4/2009 | Wu |
| 2009/0105914 A1 | 4/2009 | Buur |
| 2009/0107745 A1 | 4/2009 | Buur |
| 2009/0107755 A1 | 4/2009 | Kothari |
| 2009/0108673 A1 | 4/2009 | Wang |
| 2009/0111637 A1 | 4/2009 | Day |
| 2009/0111640 A1 | 4/2009 | Buur |
| 2009/0111642 A1 | 4/2009 | Sah |
| 2009/0111643 A1 | 4/2009 | Sah |
| 2009/0111644 A1 | 4/2009 | Kaminsky |
| 2009/0111645 A1 | 4/2009 | Heap |
| 2009/0112385 A1 | 4/2009 | Heap |
| 2009/0112392 A1 | 4/2009 | Buur |
| 2009/0112399 A1 | 4/2009 | Buur |
| 2009/0112412 A1 | 4/2009 | Cawthorne |
| 2009/0112416 A1 | 4/2009 | Heap |
| 2009/0112417 A1 | 4/2009 | Kaminsky |
| 2009/0112418 A1 | 4/2009 | Buur |
| 2009/0112419 A1 | 4/2009 | Heap |
| 2009/0112420 A1 | 4/2009 | Buur |
| 2009/0112421 A1 | 4/2009 | Sah |
| 2009/0112422 A1 | 4/2009 | Sah |
| 2009/0112423 A1 | 4/2009 | Foster |
| 2009/0112427 A1 | 4/2009 | Heap |
| 2009/0112428 A1 | 4/2009 | Sah |
| 2009/0112429 A1 | 4/2009 | Sah |
| 2009/0112495 A1 | 4/2009 | Center |
| 2009/0115349 A1 | 5/2009 | Heap |
| 2009/0115350 A1 | 5/2009 | Heap |
| 2009/0115351 A1 | 5/2009 | Heap |
| 2009/0115352 A1 | 5/2009 | Heap |
| 2009/0115353 A1 | 5/2009 | Heap |
| 2009/0115354 A1 | 5/2009 | Heap |
| 2009/0115365 A1 | 5/2009 | Heap |
| 2009/0115373 A1 | 5/2009 | Kokotovich |
| 2009/0115377 A1 | 5/2009 | Schwenke |
| 2009/0115408 A1 | 5/2009 | West |
| 2009/0115491 A1 | 5/2009 | Anwar |
| 2009/0118074 A1 | 5/2009 | Zettel |
| 2009/0118075 A1 | 5/2009 | Heap |
| 2009/0118076 A1 | 5/2009 | Heap |
| 2009/0118077 A1 | 5/2009 | Hsieh |
| 2009/0118078 A1 | 5/2009 | Wilmanowicz |
| 2009/0118079 A1 | 5/2009 | Heap |
| 2009/0118080 A1 | 5/2009 | Heap |
| 2009/0118081 A1 | 5/2009 | Heap |
| 2009/0118082 A1 | 5/2009 | Heap |
| 2009/0118083 A1 | 5/2009 | Kaminsky |
| 2009/0118084 A1 | 5/2009 | Heap |
| 2009/0118085 A1 | 5/2009 | Heap |
| 2009/0118086 A1 | 5/2009 | Heap |
| 2009/0118087 A1 | 5/2009 | Hsieh |
| 2009/0118089 A1 | 5/2009 | Heap |
| 2009/0118090 A1 | 5/2009 | Heap |
| 2009/0118091 A1 | 5/2009 | Lahti |
| 2009/0118093 A1 | 5/2009 | Heap |
| 2009/0118094 A1 | 5/2009 | Hsieh |
| 2009/0118877 A1 | 5/2009 | Center |
| 2009/0118879 A1 | 5/2009 | Heap |
| 2009/0118880 A1 | 5/2009 | Heap |
| 2009/0118882 A1 | 5/2009 | Heap |
| 2009/0118883 A1 | 5/2009 | Heap |
| 2009/0118884 A1 | 5/2009 | Heap |
| 2009/0118885 A1 | 5/2009 | Heap |
| 2009/0118886 A1 | 5/2009 | Tamai |
| 2009/0118887 A1 | 5/2009 | Minarcin |
| 2009/0118888 A1 | 5/2009 | Minarcin |
| 2009/0118901 A1 | 5/2009 | Cawthorne |
| 2009/0118914 A1 | 5/2009 | Schwenke |
| 2009/0118915 A1 | 5/2009 | Heap |
| 2009/0118916 A1 | 5/2009 | Kothari |
| 2009/0118917 A1 | 5/2009 | Sah |
| 2009/0118918 A1 | 5/2009 | Heap |
| 2009/0118919 A1 | 5/2009 | Heap |
| 2009/0118920 A1 | 5/2009 | Heap |
| 2009/0118921 A1 | 5/2009 | Heap |
| 2009/0118922 A1 | 5/2009 | Heap |
| 2009/0118923 A1 | 5/2009 | Heap |
| 2009/0118924 A1 | 5/2009 | Heap |
| 2009/0118925 A1 | 5/2009 | Hsieh |
| 2009/0118926 A1 | 5/2009 | Heap |
| 2009/0118927 A1 | 5/2009 | Heap |
| 2009/0118928 A1 | 5/2009 | Heap |
| 2009/0118929 A1 | 5/2009 | Heap |
| 2009/0118930 A1 | 5/2009 | Heap |

(56) References Cited

U.S. PATENT DOCUMENTS

| | | |
|---|---|---|
| 2009/0118931 A1 | 5/2009 | Kaminsky |
| 2009/0118932 A1 | 5/2009 | Heap |
| 2009/0118933 A1 | 5/2009 | Heap |
| 2009/0118934 A1 | 5/2009 | Heap |
| 2009/0118935 A1 | 5/2009 | Heap |
| 2009/0118936 A1 | 5/2009 | Heap |
| 2009/0118937 A1 | 5/2009 | Heap |
| 2009/0118938 A1 | 5/2009 | Heap |
| 2009/0118939 A1 | 5/2009 | Heap |
| 2009/0118940 A1 | 5/2009 | Heap |
| 2009/0118941 A1 | 5/2009 | Heap |
| 2009/0118942 A1 | 5/2009 | Hsieh |
| 2009/0118943 A1 | 5/2009 | Heap |
| 2009/0118944 A1 | 5/2009 | Heap |
| 2009/0118945 A1 | 5/2009 | Heap |
| 2009/0118946 A1 | 5/2009 | Heap |
| 2009/0118947 A1 | 5/2009 | Heap |
| 2009/0118948 A1 | 5/2009 | Heap |
| 2009/0118949 A1 | 5/2009 | Heap |
| 2009/0118950 A1 | 5/2009 | Heap |
| 2009/0118951 A1 | 5/2009 | Heap |
| 2009/0118952 A1 | 5/2009 | Heap |
| 2009/0118954 A1 | 5/2009 | Wu |
| 2009/0118957 A1 | 5/2009 | Heap |
| 2009/0118962 A1 | 5/2009 | Heap |
| 2009/0118963 A1 | 5/2009 | Heap |
| 2009/0118964 A1 | 5/2009 | Snyder |
| 2009/0118969 A1 | 5/2009 | Heap |
| 2009/0118971 A1 | 5/2009 | Heap |
| 2009/0118999 A1 | 5/2009 | Heap |
| 2009/0144002 A1 | 6/2009 | Zettel |
| 2010/0227735 A1* | 9/2010 | Sah et al. ............ 477/5 |
| 2013/0053212 A1* | 2/2013 | Naqvi et al. ......... 477/4 |
| 2013/0225361 A1* | 8/2013 | Gupta et al. ......... 477/3 |

* cited by examiner

US 8,801,567 B2

METHOD AND APPARATUS FOR EXECUTING AN ASYNCHRONOUS CLUTCH-TO-CLUTCH SHIFT IN A HYBRID TRANSMISSION

GOVERNMENT CONTRACT RIGHTS

This invention was made with U.S. Government support under Agreement No. DE-FC26-08NT04386, awarded by the U.S. Department of Energy The U.S. Government may have certain rights in this invention.

TECHNICAL FIELD

This disclosure pertains to control systems for hybrid transmissions, including shift execution.

BACKGROUND

The statements in this section merely provide background information related to the present disclosure. Accordingly, such statements are not intended to constitute an admission of prior art.

Hybrid powertrain architectures can include multiple torque-generative devices, including internal combustion engines and non-combustion torque machines, e.g., electric machines, which transmit torque through a transmission device to an output member. Known hybrid powertrain systems may be configured to operate in multiple continuously variable modes and multiple fixed-gear operating range states, one embodiment of which includes a two-mode, compound-split, electro-mechanical hybrid transmission. In one embodiment, such a hybrid transmission includes an input member for receiving tractive torque from a prime mover power source, preferably an internal combustion engine, and an output member. The output member can be operatively connected to a driveline for a motor vehicle for transmitting tractive torque thereto. Torque machines, operative as motors or generators, can generate torque inputs to the hybrid transmission independently of a torque input from the internal combustion engine. The torque machines may transform vehicle kinetic energy transmitted through the vehicle driveline to energy that is storable in an energy storage device. A control system monitors various inputs from the vehicle and the operator and provides operational control of the hybrid powertrain, including controlling transmission operating state and gear shifting, controlling the torque-generative devices, and regulating the power interchange among the energy storage device and the machines to manage outputs of the transmission, including torque and rotational speed.

Hybrid transmissions configured to operate in multiple continuously variable modes execute shifts therebetween, with such shifts including activating an oncoming clutch and deactivating an off-going clutch. Such shifting may be executed synchronously or asynchronously, with attendant noise/vibration/harshness issues.

SUMMARY

A hybrid transmission includes first and second electric machines. A method for operating the hybrid transmission in response to a command to execute a shift from an initial continuously variable mode to a target continuously variable mode includes increasing torque of an oncoming clutch associated with operating in the target continuously variable mode and correspondingly decreasing a torque of an off-going clutch associated with operating in the initial continuously variable mode. Upon deactivation of the off-going clutch, torque outputs of the first and second electric machines and the torque of the oncoming clutch are controlled to synchronize the oncoming clutch. Upon synchronization of the oncoming clutch, the torque for the oncoming clutch is increased and the transmission is operated in the target continuously variable mode.

BRIEF DESCRIPTION OF THE DRAWINGS

One or more embodiments will now be described, by way of example, with reference to the accompanying drawings, in which.

DETAILED DESCRIPTION

Figure 1:
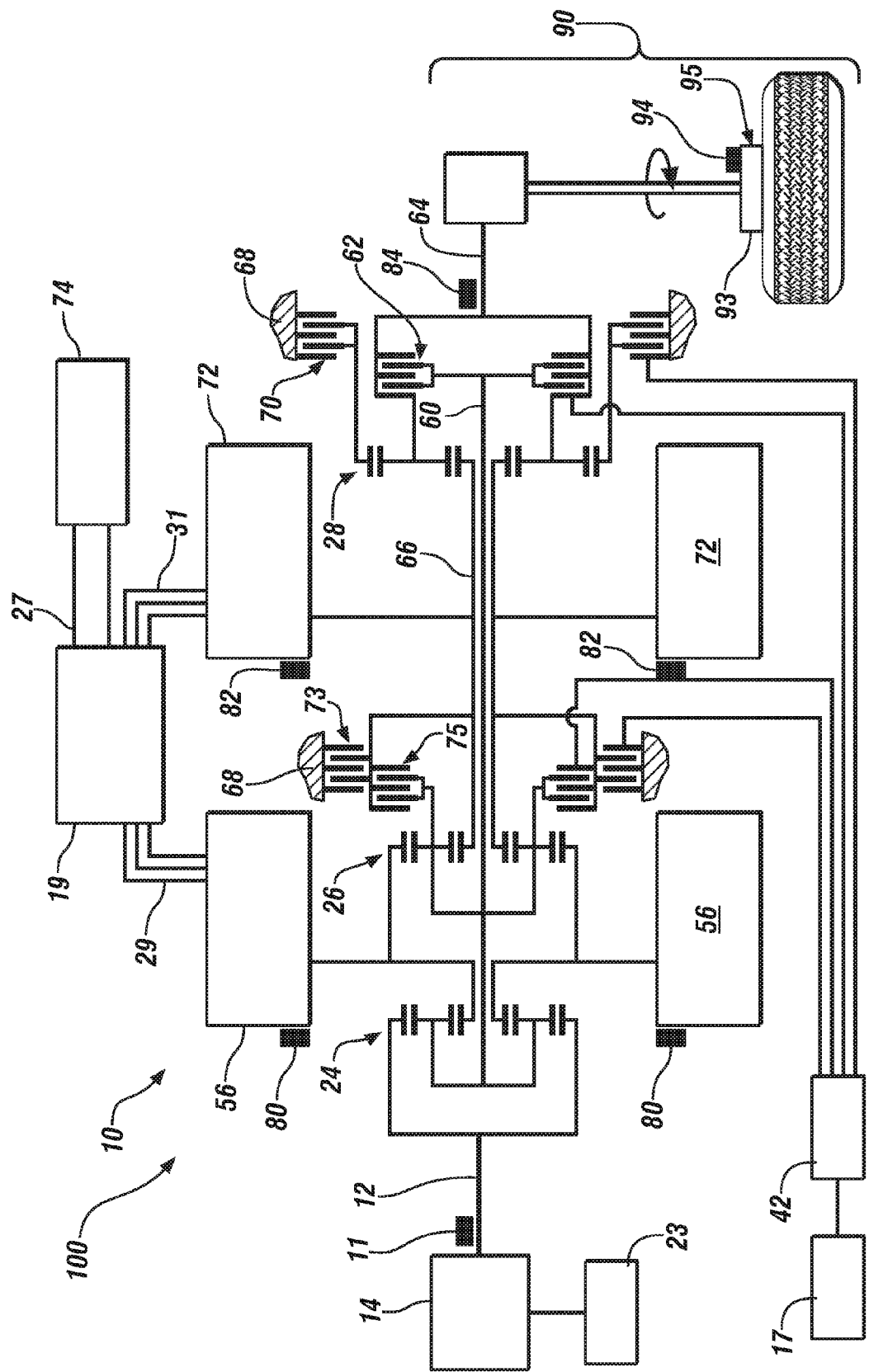
FIG. 1 is a schematic diagram of an exemplary hybrid powertrain, in accordance with the present disclosure.

Referring now to the drawings, wherein the showings are for the purpose of illustrating certain exemplary embodiments only and not for the purpose of limiting the same, FIG. 1 depicts an electro-mechanical hybrid powertrain 100. The illustrated electro-mechanical hybrid powertrain 100 includes a two-mode, compound-split, electro-mechanical hybrid transmission 10 including first and second electric machines 56 and 72, respectively, and an internal combustion engine (engine) 14. The illustrated electro-mechanical hybrid powertrain 100 is a non-limiting embodiment of a hybrid powertrain system that is configured to operate in at least two continuously variable modes.

The engine 14 and the first and second electric machines 56 and 72 each generate power in the form of torque which is transferred to the transmission 10. Power transfer from the engine 14 and the first and second electric machines 56 and 72 is described in terms of input torque, motor A torque, and motor B torque, respectively, and input speed, motor A speed, and motor B speed, respectively. Generated torque may be in the form of tractive torque or reactive torque. Tractive torque is positive torque that is generated to accelerate an output member 64 of the transmission 10, and hence accelerate a vehicle. Reactive torque is negative torque that is generated to decelerate the output member 64 of the transmission 10, and hence decelerate the vehicle.

The engine 14 preferably includes a multi-cylinder internal combustion engine selectively operative in several states to transfer torque to the transmission 10 via an input member 12, and may be either a spark-ignition or a compression-ignition engine. Operation of the engine is controlled by an engine control module (ECM) 23. The engine 14 includes a crankshaft coupled to the input member 12 of the transmission 10. A rotational speed sensor 11 monitors rotational speed of the input member 12. Power output from the engine 14, including rotational speed and engine torque, may differ from the input speed and the input torque to the transmission 10 due to placement of torque-consuming components on the input member 12 between the engine 14 and the transmission 10, e.g., a hydraulic pump and/or a torque management device.

The transmission 10 in one embodiment includes three planetary-gear sets 24, 26 and 28, and four selectively engageable torque-transferring devices, i.e., clutches C1 70, C2 62, C3 73, and C4 75. As used herein, clutches refer to any type of friction torque transfer device including single or compound plate clutches or packs, band clutches, and brakes, for example. A hydraulic control circuit 42, preferably controlled by a transmission control module (TCM) 17, is operative to control clutch states. Clutches C2 62 and C4 75 preferably include hydraulically-applied rotating friction clutches. Clutches C1 70 and C3 73 preferably include hydraulically-controlled stationary devices that can be selectively grounded to a transmission case 68. Each of the clutches C1 70, C2 62, C3 73, and C4 75 is preferably hydraulically applied, selectively receiving pressurized hydraulic fluid via the hydraulic control circuit 42.

The first and second electric machines 56 and 72 preferably include three-phase AC machines, each including a stator and a rotor, and respective resolvers 80 and 82. The motor stator for each machine is grounded to an outer portion of the transmission case 68, and includes a stator core with coiled electrical windings extending therefrom. The rotor for the first electric machine 56 is supported on a hub plate gear that is operatively attached to shaft 60 via the second planetary gear set 26. The rotor for the second electric machine 72 is fixedly attached to a sleeve shaft hub 66.

Each of the resolvers 80 and 82 preferably includes a variable reluctance device including a resolver stator and a resolver rotor. The resolvers 80 and 82 are appropriately positioned and assembled on respective ones of the first and second electric machines 56 and 72. Each of the resolvers 80 and 82 senses and monitors rotational position of the resolver rotor relative to the resolver stator, thus monitoring rotational position of respective ones of first and second electric machines 56 and 72. Additionally, the signals output from the resolvers 80 and 82 are interpreted to provide the rotational speeds for first and second electric machines 56 and 72.

The transmission 10 includes the output member 64, e.g., a shaft that is coupled to a driveline 90 for a vehicle to provide output power that is transferred to vehicle wheels 93, one of which is shown in FIG. 1. The output power at the output member 64 is characterized in terms of an output rotational speed and an output torque. A transmission output speed sensor 84 monitors rotational speed and rotational direction of the output member 64. Each of the vehicle wheels 93 is preferably equipped with a sensor 94 adapted to monitor wheel speed, the output of which is monitored by a control module of the distributed controller system described with reference to FIG. 2 to determine vehicle speed, and absolute and relative wheel speeds for braking control, traction control, and vehicle acceleration management. Each of the vehicle wheels 93 is equipped with a friction brake 95 for applying friction braking torque.

The input torque, motor A torque and motor B torque are generated as a result of energy conversion from fuel or electrical potential stored in an electrical energy storage device (ESD) 74. The ESD 74 is high voltage DC-coupled to an inverter module (TPIM) 19 via DC transfer conductors 27. The TPIM 19 employs transfer conductors 29 to transfer electrical power to and from the first electric machine 56, and the TPIM 19 similarly employs transfer conductors 31 to transfer electrical power to and from the second electric machine 72 in response to commands for the motor A torque and the motor B torque. Electrical current is transmitted to and from the ESD 74 in accordance with whether the ESD 74 is being charged or discharged. The TPIM 19 includes power inverters and respective motor control modules configured to receive the torque commands and control inverter states in response to the commands for motor A torque and motor B torque. The power inverters include known complementary three-phase power electronics devices, and each includes a plurality of insulated gate bipolar transistors for converting DC power from the ESD 74 to AC power for powering respective ones of the first and second electric machines 56 and 72, by switching at high frequencies.

Figure 2:
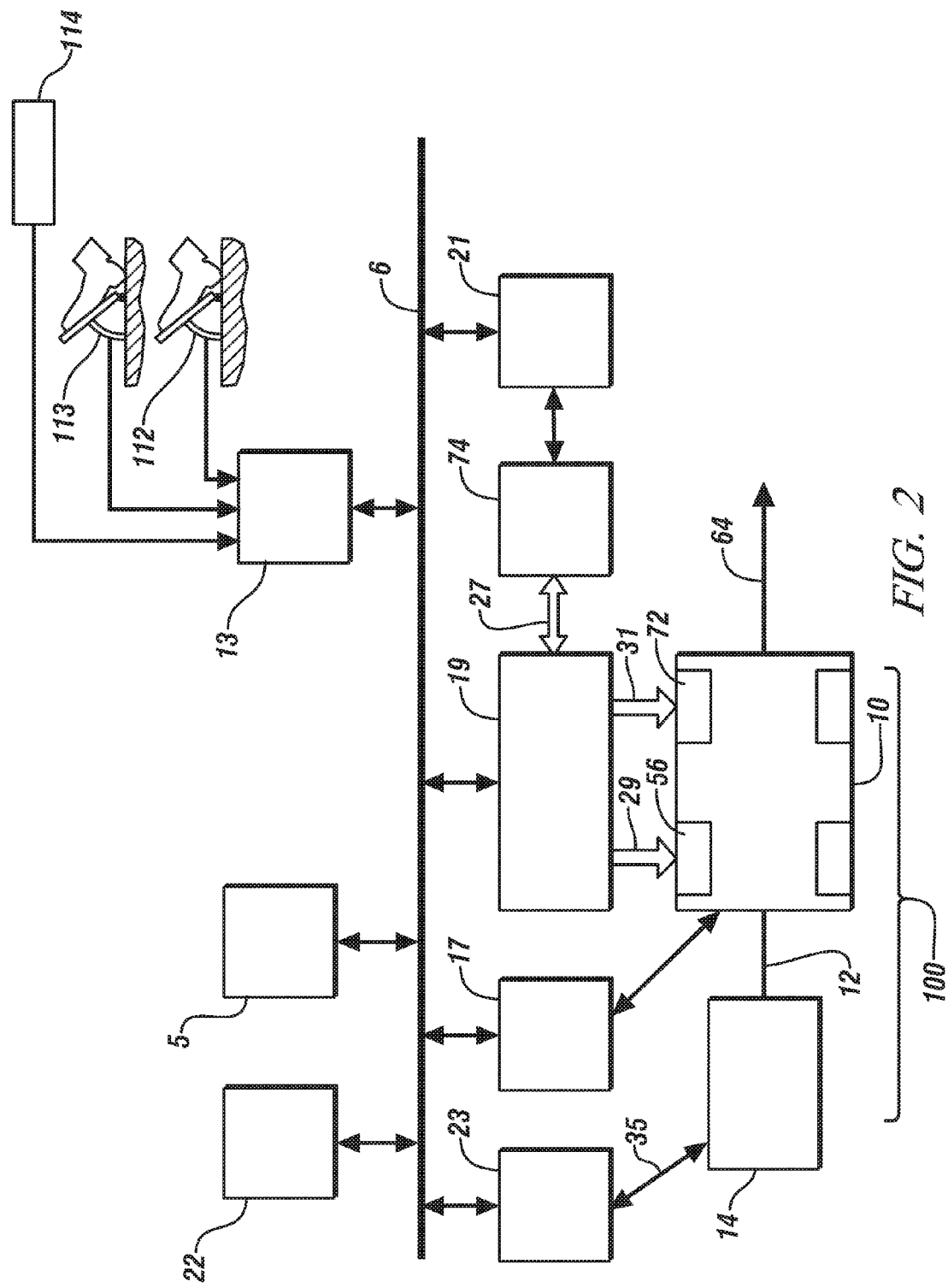
FIG. 2 is a schematic diagram of an exemplary architecture for a control system and hybrid powertrain, in accordance with the present disclosure.

FIG. 2 schematically shows an embodiment of a distributed controller system configured to control the hybrid powertrain 100 of FIG. 1. The elements described hereinafter include a subset of an overall vehicle control architecture, and provide coordinated system control of the hybrid powertrain 100 described in FIG. 1. The distributed control module system synthesizes pertinent information and inputs, and executes routines to control various actuators to meet control objectives, including objectives related to fuel economy, emissions, performance, drivability, and protection of hardware, including batteries of ESD 74 and the first and second electric machines 56 and 72. The distributed control module system includes the ECM 23, the TCM 17, a battery pack control module (BPCM) 21, and the TPIM 19. A hybrid control module (HCP) 5 provides supervisory control and coordination of the ECM 23, the TCM 17, the BPCM 21, and the TPIM 19. A user interface (UI) 13 is operatively connected to a plurality of operator input devices through which a vehicle operator generates an output torque request for controlling and directing operation of the hybrid powertrain 100. The operator input devices may include an accelerator pedal 113, an operator brake pedal 112, a transmission gear selector 114, e.g., a PRNDL selector, a vehicle speed cruise control, and other suitable devices for determining the output torque request. The transmission gear selector 114 may have a discrete number of operator-selectable positions, including the rotational direction of the output member 64 to enable one of a forward and a reverse direction of vehicle movement.

The aforementioned control modules communicate with other control modules, sensors, and actuators via a local area network (LAN) bus 6. The LAN bus 6 allows for structured communication of states of operating parameters and actuator command signals between the various control modules. The specific communication protocol utilized is application-specific. The LAN bus 6 and appropriate protocols provide for robust messaging and multi-control module interfacing between the aforementioned control modules, and other control modules providing functionality including e.g., antilock braking, traction control, and vehicle stability. Multiple communications buses may be used to improve communications speed and provide some level of signal redundancy and integrity. Communication between individual control modules may also be effected using a direct link, e.g., a serial peripheral interface (SPI) bus.

The HCP 5 determines an output torque request, an output torque command, an engine input torque command, clutch torque(s) for the applied torque-transfer clutches C1 70, C2 62, C3 73, C4 75 of the transmission 10, and motor A torque and motor B torque commands for the first and second electric machines 56 and 72 in response to various input signals from the user interface 13 and the hybrid powertrain 100 including the ESD 74.

The ECM 23 connects to the engine 14 to acquire data from sensors and control actuators of the engine 14 over a plurality of discrete lines. The ECM 23 receives the engine input torque command from the HCP 5. The ECM 23 determines the actual engine input torque provided to the transmission 10 at that point in time based upon monitored engine speed and load, which is communicated to the HCP 5. The ECM 23 monitors input from the rotational speed sensor 11 to determine the engine input speed to the input member 12, which translates to the transmission input speed. The ECM 23 monitors inputs from sensors to determine states of other engine operating parameters including, e.g., a manifold pressure, engine coolant temperature, ambient air temperature, and ambient pressure. The engine load may be determined, for example, from the manifold pressure, or alternatively, from monitoring operator input to the accelerator pedal 113. The ECM 23 generates and communicates command signals to control engine actuators, including, e.g., fuel injectors, ignition modules, and throttle control modules, none of which are shown.

The TCM 17 operatively connects to the transmission 10 and monitors inputs from sensors to determine states of transmission operating parameters. The TCM 17 generates and communicates command signals to control the transmission 10, including controlling the hydraulic circuit 42. Inputs from the TCM 17 to the HCP 5 include estimated clutch torques for each of the clutches, i.e., C1 70, C2 62, C3 73, and C4 75, and rotational output speed of the output member 64. Other actuators and sensors may be used to provide additional information from the TCM 17 to the HCP 5 for control purposes. The TCM 17 monitors inputs from pressure switches and selectively actuates pressure control solenoids and shift solenoids of the hydraulic circuit 42 to selectively actuate the various clutches C1 70, C2 62, C3 73, and C4 75 to achieve various transmission operating range states, as described hereinbelow.

The BPCM 21 signally connects to sensors to monitor the ESD 74, including states of electrical current and voltage parameters, to provide information indicative of parametric states of the batteries of the ESD 74 to the HCP 5. The parametric states of the batteries preferably include battery state-of-charge, battery voltage, battery temperature, and available battery power.

A brake control module (BrCM) 22 operatively connects to the friction brakes 95 on each of the vehicle wheels 93. The BrCM 22 monitors the operator input to the brake pedal 112 and generates control signals to control the friction brakes 95 and sends a control signal to the HCP 5 to operate the first and second electric machines 56 and 72 based thereon, such as for energy capture by regenerative braking operation. This includes commanding a blended brake torque, which is a combination of the friction braking torque generated at the wheels 93 and the output torque generated at the output member 64 which reacts with the driveline 90 to decelerate the vehicle in response to the operator input to the brake pedal 112.

Control module, module, control, controller, control unit, processor and similar terms mean any one or various combinations of one or more of Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs or routines, combinational logic circuit(s), input/output circuit(s) and devices, appropriate signal conditioning and buffer circuitry, and other components to provide the described functionality. Software, firmware, programs, instructions, routines, code, algorithms and similar terms mean any controller executable instruction sets including calibrations and look-up tables. The control module has a set of control routines executed to provide the desired functions. Routines are executed, such as by a central processing unit, and are operable to monitor inputs from sensing devices and other networked control modules, and execute control and diagnostic routines to control operation of actuators. Routines may be executed at regular intervals, for example each 3.125, 6.25, 12.5, 25 and 100 milliseconds during ongoing engine and vehicle operation. Alternatively, routines may be executed in response to occurrence of an event.

The hybrid powertrain 100 selectively operates in one of several propulsion states that may be described in terms of engine states including one of an engine-on state (ON) and an engine-off state (OFF), and transmission operating range states including a plurality of fixed-gear and continuously variable modes, described with reference to Table 1, below.

TABLE 1

| Transmission Operating Range State | Engine State | Applied Clutches | |
|---|---|---|---|
| EVT Mode 1 | ON or OFF | C1 70 | |
| G1 | ON | C1 70 | C4 75 |
| G2 | ON | C1 70 | C2 62 |
| EVT Mode 2 | ON or OFF | C2 62 | |
| G3 | ON | C2 62 | C4 75 |
| G4 | ON | C2 62 | C3 73 |
| Neutral | ON or OFF | None | |

Table 1 indicates which of the clutches C1 70, C2 62, C3 73, and C4 75 are applied for each of the transmission operating range states for the embodiment described herein. The transmission operating range states include continuously variable modes and fixed-gear modes. The continuously variable modes include a first electrically-variable transmission (EVT) mode (EVT Mode 1) and a second EVT mode (EVT Mode 2). The fixed-gear modes include a fixed ratio operation of input-to-output speed of the transmission 10. The fixed-gear modes in first (G1), second (G2), third (G3), and fourth (G4) gears, which have progressively decreasing gear ratios to achieve correspondingly increasing output speeds in relation to input speeds. The engine states include an engine-on state (ON) and an engine-off (OFF) state.

The engine-on state includes a fuel cutoff mode (FCO) wherein the engine 14 is spinning but is unfueled. For purposes of this description, the engine input speed is equal to zero revolutions per minute (RPM) when the engine state is OFF, i.e., the engine crankshaft is not spinning. In EVT Mode 1 and EVT Mode 2, the engine state may be either ON or OFF.

In response to operator inputs via the accelerator pedal 113 and brake pedal 112 as captured by the user interface 13, the HCP 5 and one or more of the other control modules determine torque commands to control the torque actuators including the engine 14 and the first and second electric machines 56 and 72 to meet the output torque request at the output member 64 that is transferred to the driveline 90. In response to input signals from the user interface 13, the HCP 5 determines the output torque request, and generates commands for operating elements of the hybrid powertrain. Commands for operating elements of the hybrid powertrain 100 include a output torque command from the transmission 10 to the driveline 90 in response to the output torque request, an input torque from the engine 14, clutch torques for the torque-transfer clutches C1 70, C2 62, C3 73, C4 75 of the transmission 10, and the motor A torque and motor B torque commands for the first and second electric machines 56 and 72, respectively. Final vehicle acceleration may be affected by other factors including, e.g., road load, road grade, and vehicle mass. The engine state and the transmission operating range state are determined based upon operating parameters of the hybrid powertrain 100. This includes the output torque request communicated through the accelerator pedal 113 and brake pedal 112 to the user interface 13 as previously described. Selection of a preferred transmission operating range state and a preferred engine state may be predicated on a torque demand caused by a command to operate the first and second electric machines 56 and 72 in an electrical energy generating mode or in a torque generating mode. Selection of the preferred transmission operating range state and the preferred engine state may be determined by an optimization algorithm or routine which determines optimum system efficiency based upon operator demand for power, battery state of charge, and energy efficiencies of the engine 14 and the first and second electric machines 56 and 72. The control system controls the input torque, motor A torque, and motor B torque in response to an outcome of the executed optimization routine, and system efficiencies are optimized thereby to manage fuel economy and battery charging in response to the output torque request. Furthermore, operation may be determined based upon a fault in a component or system. The HCP 5 monitors the torque actuators and determines the power output from the transmission 10 at output member 64 that is required to achieve the output torque request while meeting other powertrain operating demands, e.g., charging the ESD 74. As is apparent from the description above, the ESD 74 and the first and second electric machines 56 and 72 are electrically-operatively coupled for power flow therebetween. Furthermore, the engine 14, the first and second electric machines 56 and 72, and the electro-mechanical transmission 10 are mechanically-operatively coupled to transfer power therebetween to generate a power flow to the output member 64.

Figure 3:
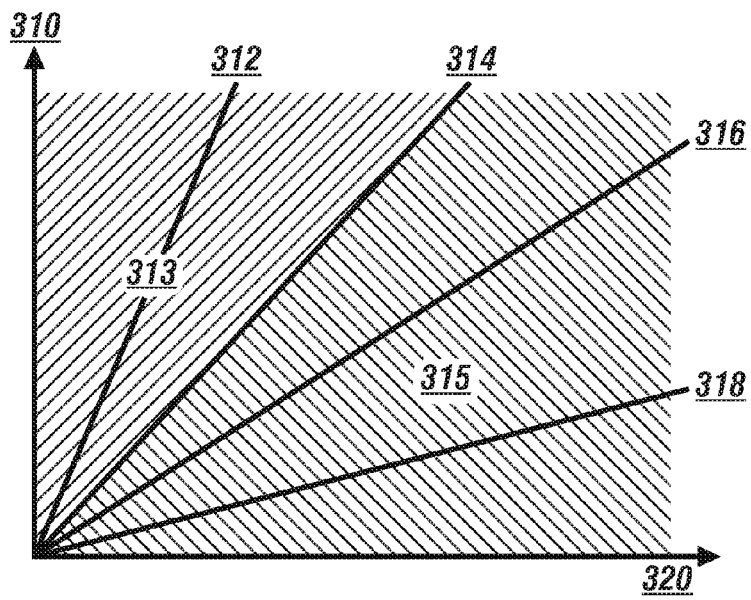
FIG. 3 graphically shows transmission input speed plotted in relation to transmission output speed including data depicting transmission operating range states for the hybrid powertrain shown in FIG. 1, in accordance with the disclosure.

FIG. 3 graphically shows transmission input speed (RPM) 310 plotted in relation to transmission output speed (RPM) 320, with data including relationships between the input speed 310 and the output speed 320 for the transmission operating range states described in Table 1 for an embodiment of the hybrid powertrain system 100 shown in FIGS. 1 and 2. The fixed-gear modes of G1 312, G2 314, G3 316, and G4 318 are depicted as individual lines. The continuously variable modes of EVT Mode 1 313 and EVT Mode 2 315 are depicted as ranges of operation.

Operation in EVT Mode 1 is effected by applying only clutch C1 70 and operation in EVT Mode 2 is effected by applying only clutch C2 62, as previously described. A known method of executing a shift between a first of the continuously variable modes and a second of the continuously variable modes includes executing a synchronous mode-to-mode shift, which includes an intermediate operation in one of the fixed gear modes that results in simultaneous application of both clutch C1 70 and clutch C2 62, i.e., G2 in one embodiment. As is appreciated, a synchronous mode-to-mode shift including operation in the fixed gear G2 may require a change in the input speed that is achieved by adjusting engine speed. Adjusting engine speed to effect intermediate operation in fixed gear G2 may result in unacceptable noise, vibration, and harshness (NVH) including, e.g., a commanded increase in the engine speed that is noticeable and unexpected by a vehicle operator. Adjusting the engine speed to effect intermediate operation in fixed gear G2 increases operating costs because energy in the form of fuel and/or electric power is expended to increase the engine speed. The adjustments in the engine speed include increasing engine speed during a downshift and decreasing engine speed during an upshift. A preferred transmission operating range state is selected in response to an output torque request and the capability of the hybrid powertrain 100 to meet that output torque request.

The HCP 5 commands execution of an asynchronous clutch-to-clutch shift to effect a shift between an initial continuously variable mode and a target continuously variable mode so long as suitable entrance criteria are met or otherwise satisfied. An exemplary asynchronous clutch-to-clutch shift is described and depicted with reference to FIG. 4. Entrance criteria for executing the asynchronous clutch-to-clutch shift are described with reference to FIG. 5. The asynchronous clutch-to-clutch shift is a transmission shift operation from an initial continuously variable mode to a target continuously variable mode that includes sequentially executing a staging period, a first period, and a second period. The staging period includes hydraulic staging of the oncoming (OC) clutch. The first period includes simultaneous overlapping activation and torque transfer by both an off-going (OG) clutch and the slipping OC clutch as the OC clutch is hydraulically activated and the OG clutch is hydraulically deactivated. The second period begins when the OG clutch is substantially deactivated, thus slipping, and includes control of the first and second electric machines 56 and 72 in a speed phase to synchronize the OC clutch elements. The second period ends when the elements of the OC clutch are synchronized, allowing the OC clutch to be completely activated with the transmission operating in the target continuously variable mode.

Figure 4:
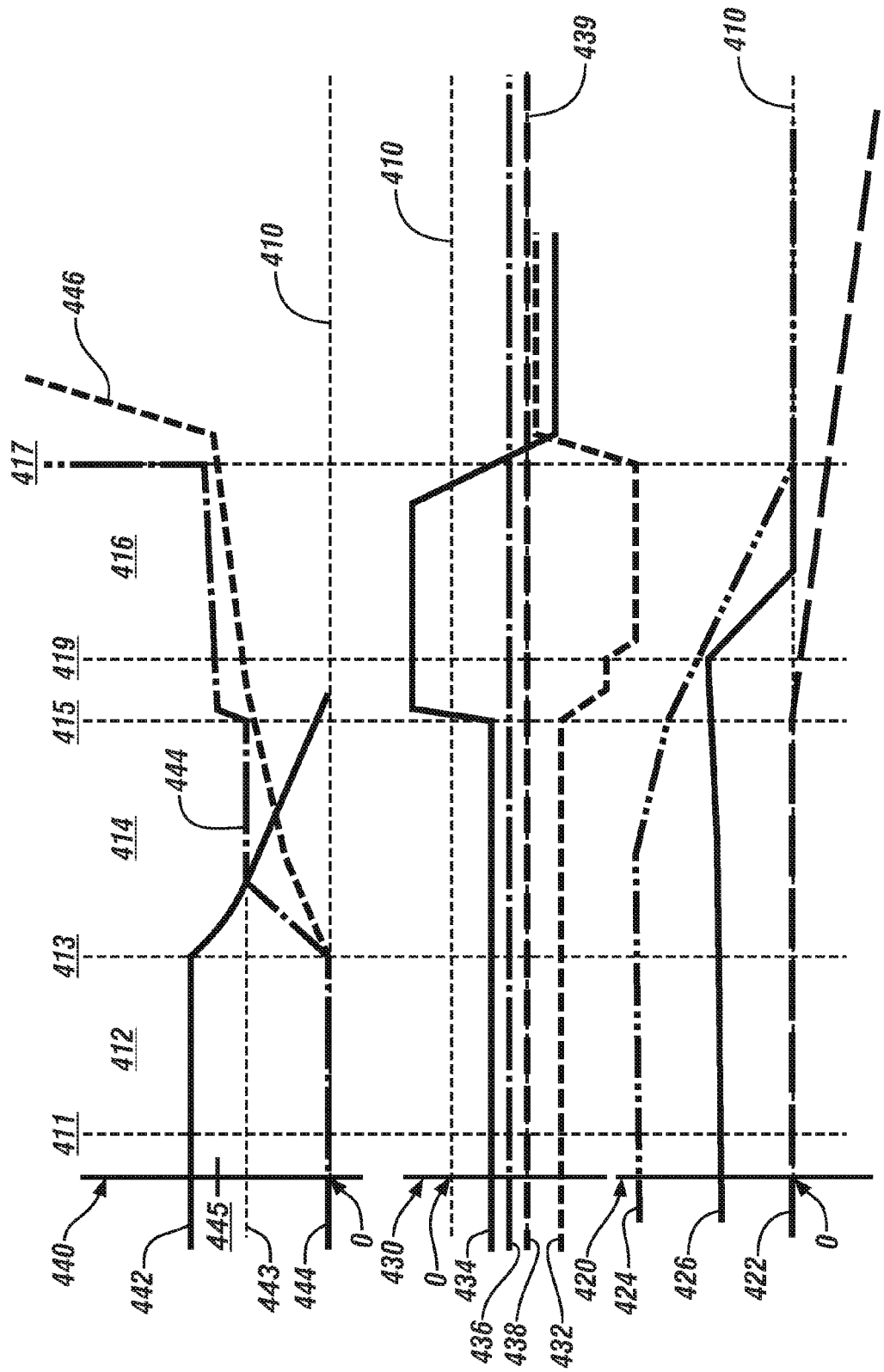
FIG. 4 graphically shows time-coincident parameters related to operating the hybrid powertrain system during execution of an asynchronous clutch-to-clutch shift, in accordance with the disclosure.

FIG. 4 graphically shows a plurality of time-coincident parameters associated with execution of an asynchronous clutch-to-clutch shift from EVT Mode 2 to EVT Mode 1, and is described with reference to operating an embodiment of the hybrid powertrain 100. This execution of an asynchronous clutch-to-clutch shift is described as a downshift event from EVT Mode 2 to EVT Mode 1 in response to an output torque request that is either a coastdown event, i.e., an operator has discontinued input to either the accelerator pedal 113 or the brake pedal 112, or a braking event wherein an operator has commanded a net braking torque through the brake pedal 112. Other operating conditions may result in a command to execute an asynchronous clutch-to-clutch shift.

The time-coincident parameters are plotted in relation to elapsed time 410 and include a speed scale (RPM) 420, a system torque scale (N-m) 430, and a clutch torque scale (N-m) 440. Parameters shown on the speed scale (RPM) 420 include OG clutch speed 422, OC clutch speed 424, and engine input speed 426. The OG clutch speed 422 and the OC clutch speed 424 indicate relative speed between the clutch elements, and thus a speed of 0 RPM indicates synchronized speed for the clutch elements. The system torque scale 430 includes torque commands for the torque actuators including the motor A torque 432, motor B torque 434, and input torque 436. An output torque request 438 and an achieved output torque 439 are also shown. Parameters shown on the clutch torque scale 440 include an OG clutch torque command 442, an OC clutch torque command 444, and an achieved OC clutch torque 446. As shown and described herein, clutch C2 70 is the off-going clutch and clutch C1 62 is the oncoming clutch when the hybrid powertrain 100 shifts from EVT Mode 2 to EVT Mode 1. Time points include time points 411, 413, 415 and 417 are indicate beginning and end of the staging period 412, the first period 414, and the second period 416.

The staging period 412 effects hydraulic staging of the oncoming (OC) clutch, and is shown beginning at time point 411. This includes activating elements of the hydraulic circuit 42 to prepare for increasing oncoming clutch pressure in a hydraulic pre-fill action prior to increasing pressure to activate the OC clutch. The engine 14 is presently operating in a FCO mode as illustrated, i.e., is spinning and is in an unfueled condition, and thus is generating a net negative torque. Thus, the motor A torque 432 and the motor B torque 434 are controlled to generate the achieved output torque 439 in response to the output torque request 438 taking into account the input torque 436. The OC clutch torque command 444 remains at zero torque, with the torque load carried through the transmission by the OG clutch, as indicated by the OG clutch torque command 442.

The staging period 412 ends and the first period 414 begins at time point 413 when there is a commanded decrease in the OG clutch torque command 442 and a corresponding commanded increase in the OC clutch torque command 444. The commanded decrease in the OG clutch torque command 442 includes a rate and magnitude of decrease that preferably corresponds to a commanded rate and magnitude of increase of the achieved OC clutch torque 446 so as to minimize or eliminate any disturbance of the output torque due to changes in clutch activations.

The first period 414 operates to effect a torque exchange between the OG clutch and the OC clutch with no or minimal disturbance on the output torque, as follows. As indicated, the OC clutch torque command 444 includes a ramped increase to a first torque magnitude 443 and the achieved oncoming clutch torque 446 increases in response thereto. As the achieved OC clutch torque 446 increases, the OC clutch speed 424 continues to slip but decreases towards a synchronization speed. The OG clutch speed 422 remains at zero and unchanged during the first period 414, indicating there is no clutch slippage in the OG clutch. The engine input speed 426 may begin to increase slightly to reduce slip speed of the OC clutch, thus reducing elapsed time of the shift event. The first period 414 includes overlapping clutch activation and torque transfer using both the OG clutch and the OC clutch as the OC clutch is hydraulically activated and the OG clutch is hydraulically deactivated.

During operation in EVT Mode 2 including during the first period 414, a target or commanded clutch torque for the OC clutch, i.e., Tc1_Tgt (when the OC clutch is C1 70) may be resolved using the following equation.

$$\begin{bmatrix} Tc1\_Tgt \\ NiDotDsrd \\ To\_Dsrd \\ Tc2 \end{bmatrix} = [A1] \cdot \begin{bmatrix} Ta \\ Tb \end{bmatrix} + [A2] \cdot Te + [A3] \cdot \begin{bmatrix} NC1Dot\_Dsrd \\ Ni \\ No\_Dot \\ No \end{bmatrix} \quad [1]$$

The relevant output terms include: NiDotDsrd, which is a desired engine input acceleration; To_Dsrd, which is a desired output torque, i.e., the output torque request generated by the vehicle operator; and Tc2, which is clutch torque for the OG clutch (clutch C2). The clutch torque for the OG clutch is assumed to be zero to determine a torque contribution from the OC clutch to satisfy EQ. 1. The relevant control terms that control and/or constrain operation of the system to limit torque output include: Ta, which is motor A torque; Tb, which is motor B torque; Te, which is engine input torque; NC1Dot_Dsrd, which is a desired OC clutch acceleration (associated with OC clutch synchronization); Ni, which is rotational speed of the input member 12; No, which is rotational speed of the output member 64; and No_dot, which is acceleration of the output member 64. The Ta and Tb terms each represents minimum and maximum motor torque limits. The desired OC clutch acceleration is zero when operating in EVT Mode 2. A1 is a 2×4 matrix of system-specific scalar values. A2 is a 1×4 matrix of system-specific scalar values. A3 is a 4×4 matrix of system-specific scalar values. The control terms that control and/or constrain operation of the system include the matrices A1, A2, and A3, which contain system-specific scalar values that take into account system constraints including constraints on motor A torque, motor B torque, battery power, and system inertias. The target clutch torque for the OC clutch is determined employing EQ. 1 by initially solving for target clutch torque for the OC clutch employing the relevant output terms and the minimum and maximum motor torque limits. Further constraints are applied, including battery power limits and clutch energy associated with the aforementioned clutch accelerations for the operating range state in order to determine the target clutch torque for the OC clutch.

The target clutch torque for the OC clutch is shown as the OC clutch torque command 444 shown in FIG. 4. The target clutch torque for the OC clutch is also constrained by OC clutch energy limits and an operating region within which the OC clutch is controllable. The TCM 17 implements the target clutch torque for the OC clutch by generating a clutch solenoid command. It is appreciated that the achieved OC clutch torque 446 lags the OC clutch torque command 444 due to mechanical and hydraulic system responses. In one embodiment, the achieved OC clutch torque 446 is estimated using a known clutch torque estimation scheme.

The operation in EVT Mode 2 during the first period 414 can be solved using the estimated achieved oncoming clutch torque as one of the constraints. This results in a rewriting of EQ. 1 as EQ. 2, as follows.

$$\begin{bmatrix} Ta \\ Tb \\ Tcr2 \end{bmatrix} = [B] \cdot \begin{bmatrix} Tc1\_estimate \\ To\_dsrd \\ NiDot \\ NoDot \\ Ni \\ Nc \end{bmatrix} \quad [2]$$

The relevant output terms include: Ta, which is the motor A torque command; Tb, which is the motor B torque command; and Tcr2, which is clutch reactive torque of the OG clutch (clutch C2). The relevant control terms that control and/or constrain operation of the system include: the estimated achieved oncoming clutch torque Tc1_estimate; To_Dsrd, which is the desired output torque, i.e., the output torque request generated by the vehicle operator; Ni_dot, which is rotational acceleration of the engine 14 via input member 12; No_dot, which is acceleration of the output member 64; Ni, which is rotational speed of the engine 14 via input member 12; and Nc, which is clutch synchronization speed of the OC clutch (C1). [B] is a 3×6 matrix of system-specific scalar values. The control terms that control and/or constrain operation of the system including the terms of the matrix [B] containing the system-specific scalar values that take into account system constraints including constraints on motor A torque and motor B torque and battery power constraints, hydraulic lag, and system inertias.

The control system employs EQ. 2 to control operation of the system, including solving for motor A torque and motor B torque and a resulting clutch reactive torque of the OG clutch using the estimated achieved oncoming clutch torque and the control terms that control and/or constrain operation of the system. As the estimated achieved oncoming clutch torque ramps up, there is a corresponding decrease in the clutch reactive torque of the OG clutch for a known desired output torque. Therefore, torque carried by the OG clutch is offloaded. If the estimated achieved oncoming clutch torque reaches the target clutch torque for the OC clutch, the operation continues to offload torque from the OG clutch with a resultant decrease in the output torque during the first period 414 of operation. The first period 414 ends when the OG clutch is substantially deactivated, thus slipping. The OG clutch torque command 442 decreases to a magnitude such that the OG clutch is unable to remain synchronized, and thus the elements thereof begin to spin asynchronously. The end of the first period 414 is indicated at time point 415, at which point the OC clutch is transferring all the torque through the transmission 10 to the output member 64.

The second period 416 begins when the OG clutch is substantially deactivated, as indicated at time point 415. The second period 416 includes control of the first and second electric machines 56 and 72 in a speed phase to synchronize the OC clutch elements and achieve an output torque 439 that is responsive to the output torque command 438. There is a step increase in the OC clutch torque command 444, a corresponding decrease in the motor A torque 432, and a corresponding increase in the motor B torque 434 to synchronize the speeds of the elements of the OC clutch, which subsequently occurs at time point 417. The OC clutch torque command 444 is increased at time point 415 to synchronize the OC clutch by controlling the first and second electric machines 56 and 72 to generate positive output torque, and thus there is a need for increased OC clutch torque to countermand the positive output torque to meet the output torque command 438.

During operation in the speed phase including during the second period 416, the output torque To may be resolved using the following equation.

$$\begin{bmatrix} Ta \\ Tb \\ To \end{bmatrix} = [C] \cdot \begin{bmatrix} Tc1\_estimate \\ Nc1Dot \\ NiDot \\ NoDot \\ Ni \\ Nc \end{bmatrix} \quad [3]$$

The relevant output terms include: Ta, which is motor A torque; Tb, which is motor B torque; and To, which is the output torque.

The relevant control terms that control and/or constrain operation of the system include: the estimated achieved oncoming clutch torque Tc1_estimate; Nc1Dot, which is clutch acceleration of the OC clutch (C1); Ni_dot, which is rotational acceleration of the engine 14 via input member 12; No_dot, which is acceleration of the output member 64; Ni, which is rotational speed of the engine 14 via input member 12; and Nc, which is clutch synchronization speed of the OC clutch (C1). [C] is a 3×6 matrix of system-specific scalar values. The control terms that control and/or constrain operation of the system including the terms of the matrix [C] containing the system-specific scalar values that take into account system constraints including constraints associated with motor A torque and motor B torque, battery power, hydraulic lag, and system inertias.

During operation in the second period 416, e.g., as shown at time point 419, there may be a command to shut the engine off in the form of a command to change the engine mode to the engine-off state. The command to change the engine mode to the engine-off state requires a further decrease in the motor A torque 432, as indicated, with a corresponding ramped decrease in the engine input speed 426 to zero. As synchronization of the speeds of the elements of the OC clutch is approached, the motor B torque 434 decreases to allow a smooth synchronization and activation of the OC clutch.

The second period 416 ends when the elements of the OC clutch are synchronized and the OC clutch torque command 444 increases as a step command, allowing the OC clutch to be completely activated with the transmission operating in the target continuously variable mode, as indicated at time point 417. The OC clutch speed 424 is zero, indicating synchronization and zero clutch slippage.

Operating in the target continuously variable mode includes controlling the motor A torque 432 and the motor B torque 434 so that the achieved output torque 439 is responsive to the output torque request 438. This operation allows recapture of regenerative energy in the target continuously variable mode including a possibility of operating with the engine in the engine-off state. This asynchronous clutch-to-clutch shift precludes an intermediate operation in fixed gear G2 with its associated power costs and constraints. The asynchronous clutch-to-clutch shift achieves a rapid transition to operating the transmission 10 in the first EVT mode with the engine in the OFF state (M1_Eng_Off).

During subsequent operation in the target continuously variable mode, the output torque To may be resolved using the following equation:

$$\begin{bmatrix} To\_acv \\ NiDotDsrd \\ TCl \end{bmatrix} = [K1] \cdot \begin{bmatrix} Ta \\ Tb \end{bmatrix} + [K2] \cdot Te + [K3] \cdot \begin{bmatrix} Ni \\ No\_Dot \\ No \end{bmatrix} \quad [4]$$

wherein To_acv is the achieved output torque, which is determined using EQ. 4 with NiDotDsrd as the preferred input acceleration,
TC1 is the clutch capacity of the OC clutch, i.e., C1, and [K1], [K2], and [K3] are matrices of system-specific scalar values.

The control terms that control and/or constrain operation of the system including the terms of the matrices [K1], [K2], and [K3] containing the system-specific scalar values that take into account system constraints including constraints on motor A torque and motor B torque and battery power constraints, hydraulic lag, and system inertias.

Figure 5:
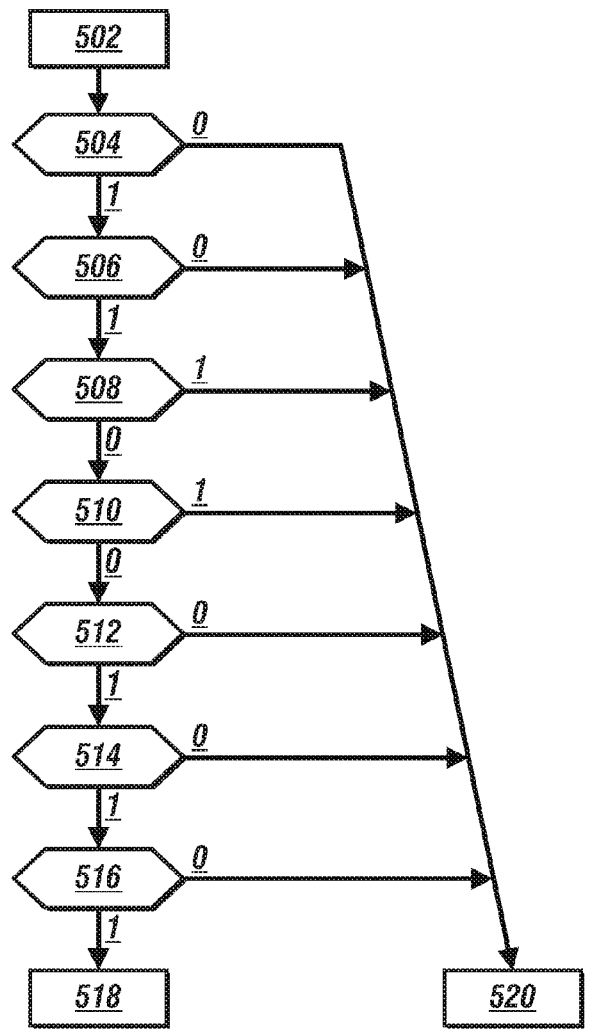
FIG. 5 is a schematic flow diagram of a control scheme for evaluating criteria associated with deciding whether to command an asynchronous clutch-to-clutch shift, in accordance with the present disclosure.

FIG. 5 schematically shows a flowchart 500 for controlling operation of the hybrid powertrain 100 that includes evaluating criteria associated with deciding whether to command the asynchronous clutch-to-clutch shift. Table 2 is provided as a key to FIG. 5 wherein the numerically labeled blocks and the corresponding functions are set forth as follows.

TABLE 2

| BLOCK | BLOCK CONTENTS |
|---|---|
| 502 | Monitor transmission operating range state, output torque request, engine speed, transmission operation |
| 504 | Are present and target transmission operating range states both continuously variable modes? |
| 506 | Is the output torque request within allowable range for asynchronous clutch-to-clutch shift? |
| 508 | Is change in engine speed from present engine speed to engine speed required for fixed gear operation less than NVH threshold? |
| 510 | Is target engine speed for operating target continuously variable mode near target engine speed required for synchronous shift? |

TABLE 2-continued

| BLOCK | BLOCK CONTENTS |
| --- | --- |
| 512 | Is transmission oil temperature greater than threshold? |
| 514 | Is commanded powertrain output torque greater than allowable limit? |
| 516 | Is actual torque less than allowable limit for asynchronous clutch-to-clutch shift? |
| 518 | Execute asynchronous clutch-to-clutch shift |
| 520 | Execute synchronous mode-to-mode shift |

The flowchart 500 is executed as one or more routines in one of the control modules of the hybrid powertrain 100. Operation of the hybrid powertrain 100 including the transmission 10 is regularly and ongoingly monitored, with monitored states including the transmission operating range state, the output torque request, engine input speed, output speed of the transmission, transmission oil temperature, and other parameters (502).

It is initially determined whether execution of asynchronous clutch-to-clutch shift is a preferred shift execution strategy, e.g., when the present and target transmission operating range states are both continuously variable modes (504). This includes determining whether the present transmission operating range state is one of the continuously variable modes (1). It is appreciated that if one or both the present and target transmission operating range states is a fixed gear state (0), execution of the asynchronous clutch-to-clutch shift is not permitted (520).

It is determined whether the output torque request is within allowable range for execution of the asynchronous clutch-to-clutch shift (506). The allowable range for the output torque request includes an output torque request that is associated with an operator having minimal or no input to the accelerator pedal 113 in one embodiment, which includes coastdown and braking events. In one embodiment, when the operator engages the accelerator pedal 113 requesting output torque, the output torque request is outside the allowable range for execution of the asynchronous clutch-to-clutch shift (0) and execution of the asynchronous clutch-to-clutch shift is not permitted (520). Other suitable output torque request states for permitting or forbidding execution of the asynchronous clutch-to-clutch shift may be selected.

It is determined whether a change in engine speed from the present engine speed to a target engine speed that is required to effect a fixed gear operation associated with the synchronous mode-to-mode shift, e.g., gear G2, is less than an NVH threshold (508). The NVH threshold is a maximum threshold for change in the engine speed that is unexpected in a coastdown event or braking event and is discernible to the vehicle operator. In one embodiment, a maximum suitable NVH threshold may be a change in the engine speed in the range of 700 RPM. As such, if the change in engine speed associated with a synchronous mode-to-mode shift is greater than the NVH threshold (1), execution of the asynchronous shift is not permitted (520). Otherwise, if the change in engine speed is less than the NVH threshold (0), operation continues if the change in engine speed is less than the NVH threshold.

It is determined whether the target engine speed for operating in the target continuously variable mode operation is near an engine speed required for executing a synchronous mode-to-mode shift (510). This infers that the engine will remain in the ON state subsequent to completing the shift execution. When the target engine speed for operating in the target continuously variable mode operation is substantially near the engine speed required for executing a synchronous mode-to-mode shift (1), the control system preferentially elects to execute a synchronous mode-to-mode shift because there is no NVH benefit to executing the asynchronous clutch-to-clutch. Thus, execution of the asynchronous clutch-to-clutch shift is not permitted (520). Otherwise, operation continues when the target engine speed for operating in the target continuously variable mode operation is substantially less than the engine speed required for executing the synchronous mode-to-mode shift (0).

It is determined whether the transmission oil temperature is greater than a minimum threshold (512). When the transmission oil temperature is less than the minimum threshold (0), execution of the asynchronous shift is not permitted (520). This action avoids undue mechanical stress on the transmission under conditions when it has not been adequately warmed up. Otherwise, operation continues when the transmission oil temperature is greater than the minimum threshold (1).

It is determined whether the commanded powertrain output torque greater than an allowable limit (514). Execution of the asynchronous clutch-to-clutch shift is not desired when a magnitude of powertrain braking is commanded because the loss of electrical charging due to loss of regenerative braking may be unacceptable under certain conditions (0), and execution of the asynchronous clutch-to-clutch shift is not permitted (520). Otherwise, operation continues (1).

It is determined whether the present output torque is less than an allowable limit for the asynchronous clutch-to-clutch shift. If so (0), execution of the asynchronous clutch-to-clutch shift is not permitted (520). Otherwise (1), execution of the asynchronous clutch-to-clutch shift is permitted (518).

When the asynchronous clutch-to-clutch shift is not permitted, another shift is executed, e.g., a synchronous mode-to-mode shift (520).

Execution of the asynchronous clutch-to-clutch shift as a preferred shift execution strategy has been shown to reduce NVH during the shift, reduce shift-related fuel consumption, in increase energy recapture. The shift-related fuel consumption is reduced by avoiding engine speed increase associated with execution of a synchronous shift. The energy recapture is increased by permitting rapid change of the engine to the engine-off state with the transmission operating in EVT Mode 1 and subsequent regenerative braking mode operation.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. Method for operating a hybrid transmission including first and second electric machines in response to a command to execute a shift from an initial continuously variable mode to a target continuously variable mode, comprising:

increasing torque of an oncoming clutch associated with operating in the target continuously variable mode and correspondingly decreasing a torque of an off-going clutch associated with operating in the initial continuously variable mode;

upon deactivation of the off-going clutch, controlling torque outputs of the first and second electric machines and the torque of the oncoming clutch to synchronize the oncoming clutch; and upon synchronization of the oncoming clutch, increasing the torque of the oncoming clutch and operating the transmission in the target continuously variable mode, wherein increasing the torque of the oncoming clutch occurs at a rate and a magnitude equivalent to the rate and magnitude of decreasing the torque of the off-going clutch.

2. The method of claim 1, wherein increasing the torque of the oncoming clutch and correspondingly decreasing the torque of the off-going clutch comprises controlling the torque of the oncoming clutch to generate a transmission output torque responsive to an output torque request.

3. Method for operating a hybrid transmission including first and second electric machines in response to a command to execute a shift from an initial continuously variable mode to a target continuously variable mode, comprising:
   increasing torque of an oncoming clutch associated with operating in the target continuously variable mode and correspondingly decreasing a torque of an off-going clutch associated with operating in the initial continuously variable mode;
   upon deactivation of the off-going clutch, controlling torque outputs of the first and second electric machines and the torque of the oncoming clutch to synchronize the oncoming clutch; and
   upon synchronization of the oncoming clutch, increasing the torque of the oncoming clutch and operating the transmission in the target continuously variable mode, wherein increasing torque of the oncoming clutch and correspondingly decreasing the torque of the off-going clutch comprises determining torque of the oncoming clutch in accordance with the following relationship:

$$\begin{bmatrix} Ta \\ Tb \\ Tcr2 \end{bmatrix} = [B] \cdot \begin{bmatrix} Tc1\_estimate \\ To\_dsrd \\ NiDot \\ NoDot \\ Ni \\ Nc \end{bmatrix}$$

wherein Ta is a torque command for the first electric machine,
   Tb is a torque command for the second electric machine,
   Tcr2 is clutch reactive torque of the off-going clutch,
   Tc1_estimate is an estimate of the torque of the oncoming clutch,
   To_Dsrd is the output torque request,
   Ni_dot is rotational acceleration of an input member of the hybrid transmission,
   No_dot is acceleration of an output member of the hybrid transmission,
   Ni is rotational speed of the input member,
   Nc is a clutch synchronization speed of the oncoming clutch, and
   B is a 3×6 matrix of system-specific scalar values.

4. The method of claim 1, wherein said shift is commanded in response to an output torque request comprising an operator braking request.

5. The method of claim 1, wherein said shift is commanded in response to an output torque request comprising a deceleration event.

6. Method for operating a hybrid transmission configured to operate in one of two continuously variable modes, comprising:
   monitoring entrance criteria for executing an asynchronous clutch-to-clutch shift in the hybrid transmission; and
   executing the asynchronous clutch-to-clutch shift in response to a command to shift the hybrid transmission from an initial continuously variable mode to a target continuously variable mode when the entrance criteria are satisfied;
   wherein the asynchronous clutch-to-clutch shift comprises:
      increasing torque of an oncoming clutch associated with operating in the target continuously variable mode and correspondingly decreasing a torque of an off-going clutch associated with operating in the initial continuously variable mode;
      upon deactivation of the off-going clutch, controlling torque outputs of first and second electric machines and the torque of the oncoming clutch to synchronize the oncoming clutch; and
   upon synchronization of the oncoming clutch, increasing the torque of the oncoming clutch and operating in the target continuously variable mode, wherein increasing the torque of the oncoming clutch occurs at a rate and a magnitude equivalent to the rate and magnitude of decreasing the torque of the off-going clutch.

7. The method of claim 6:
   wherein monitoring entrance criteria comprises monitoring transmission temperature; and
   wherein entrance criteria are satisfied when the transmission temperature is greater than a threshold temperature.

8. The method of claim 6, wherein increasing the torque of the oncoming clutch comprises controlling the torque of the oncoming clutch to generate a transmission output torque responsive to an output torque request.

9. The method of claim 6, wherein said shift is commanded in response to an output torque request comprising an operator braking request.

10. The method of claim 6, wherein said shift is commanded in response to an output torque request comprising a deceleration event.

11. Method for operating a hybrid transmission including first and second electric machines and a control module configured to execute an asynchronous clutch-to-clutch shift, comprising:
   increasing torque of an oncoming clutch associated with operating in a target continuously variable mode and correspondingly decreasing a torque of an off-going clutch associated with operating in an initial continuously variable mode including controlling the torque of the oncoming clutch to control magnitude of the output torque of the electrically-variable transmission, wherein increasing the torque of the oncoming clutch occurs at a rate and a magnitude equivalent to the rate and magnitude of decreasing the torque of the off-going clutch;
   upon deactivation of the off-going clutch, controlling torque outputs of the first and second electric machines and the torque of the oncoming clutch to synchronize the oncoming clutch and to respond to an output torque request; and
   upon synchronization of the oncoming clutch, increasing the torque of the oncoming clutch and operating in the target continuously variable mode in response to the output torque request.

* * * * *